(12) United States Patent
Byun et al.

(10) Patent No.: US 10,843,652 B2
(45) Date of Patent: Nov. 24, 2020

(54) FAR-SIDE AIRBAG DEVICE OF VEHICLE

(71) Applicant: AUTOLIV DEVELOPMENT AB, Vårgårda (SE)

(72) Inventors: Jong Ki Byun, Hwaseong-si (KR); Par Sandinge, Vårgårda (SE); Mats Berntsson, Vårgårda (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 18 days.

(21) Appl. No.: 16/321,071

(22) PCT Filed: Jul. 28, 2017

(86) PCT No.: PCT/KR2017/008195
§ 371 (c)(1),
(2) Date: Jan. 28, 2019

(87) PCT Pub. No.: WO2018/021887
PCT Pub. Date: Feb. 1, 2018

(65) Prior Publication Data
US 2019/0152421 A1    May 23, 2019

(30) Foreign Application Priority Data
Jul. 28, 2016 (KR) .................. 10-2016-0096222

(51) Int. Cl.
*B60R 21/207* (2006.01)
*B60R 21/00* (2006.01)
(Continued)

(52) U.S. Cl.
CPC ............ *B60R 21/207* (2013.01); *B60R 21/00* (2013.01); *B60R 21/231* (2013.01);
(Continued)

(58) Field of Classification Search
CPC ..... B60R 21/20; B60R 21/217; B60R 21/207; B60R 2021/23386; B60R 2021/23146; B60R 2021/23161
See application file for complete search history.

(56) References Cited

U.S. PATENT DOCUMENTS

2010/0194083 A1* 8/2010 Sugimoto ............. B60R 21/207
 280/730.2
2012/0038137 A1* 2/2012 Wipasuramonton .... B60R 21/18
 280/733
(Continued)

FOREIGN PATENT DOCUMENTS

JP  2010070003 A  * 4/2010
JP  2014-054956 A    3/2014
(Continued)

OTHER PUBLICATIONS

Fukuyama et al., Airbag Device, Apr. 2, 2010, EPO, JP 2010-70003 A, English Abstract (Year: 2010).*
(Continued)

*Primary Examiner* — James A English
(74) *Attorney, Agent, or Firm* — Stephen T. Olson; Harness, Dickey & Pierce, P.L.C.

(57) ABSTRACT

A far-side airbag device of a vehicle includes an airbag which is unfolded upon inflation between at least two backrests arranged in the width direction of the vehicle and includes an inner panel facing a passenger and an outer panel facing the central axis of the vehicle at the time of inflation. The far-side airbag device includes a rotation preventing bracket for pressing the rear end of the airbag to prevent the airbag from rotating about the rear end of the airbag by an impact from the passenger at the time of collision of the vehicle, so that it is possible to increase a restraining force for preventing the passenger from moving toward the inside of the vehicle by preventing the airbag from rotating about (Continued)

a fastening portion on the rear end by the impact applied from the passenger due to the collision of the vehicle.

12 Claims, 13 Drawing Sheets

(51) Int. Cl.
  *B60R 21/231* (2011.01)
  *F16B 5/02* (2006.01)
  *B60R 21/2334* (2011.01)
(52) U.S. Cl.
  CPC .......... *B60R 21/2334* (2013.01); *F16B 5/02* (2013.01); *B60R 2021/23146* (2013.01); *B60R 2021/23161* (2013.01)

(56) References Cited

U.S. PATENT DOCUMENTS

| | | | | |
|---|---|---|---|---|
| 2012/0049498 | A1* | 3/2012 | Wiik | B60R 21/23138 280/743.2 |
| 2016/0031407 | A1* | 2/2016 | Yamanaka | B60R 21/233 280/728.2 |
| 2018/0236964 | A1* | 8/2018 | Hallbauer | B60R 21/207 |
| 2019/0161053 | A1* | 5/2019 | Gwon | B60R 21/23138 |
| 2019/0225183 | A1* | 7/2019 | Garnier | B60R 21/207 |

FOREIGN PATENT DOCUMENTS

| | | |
|---|---|---|
| KR | 10-2012-0123907 A | 11/2012 |
| KR | 10-2012-0126647 A | 11/2012 |
| KR | 10-2013-0008338 A | 1/2013 |
| KR | 10-2013-0019627 A | 2/2013 |

OTHER PUBLICATIONS

Fukuyama et al., Airbag Device, Apr. 2, 2010, EPO, JP 2010-70003 A, Machine Translation of Description (Year: 2010).*

International Search Report (in English and Korean) and Written Opinion (in Korean) issued in PCT/KR2017/008195, dated Nov. 28, 2017; ISA/KR.

* cited by examiner

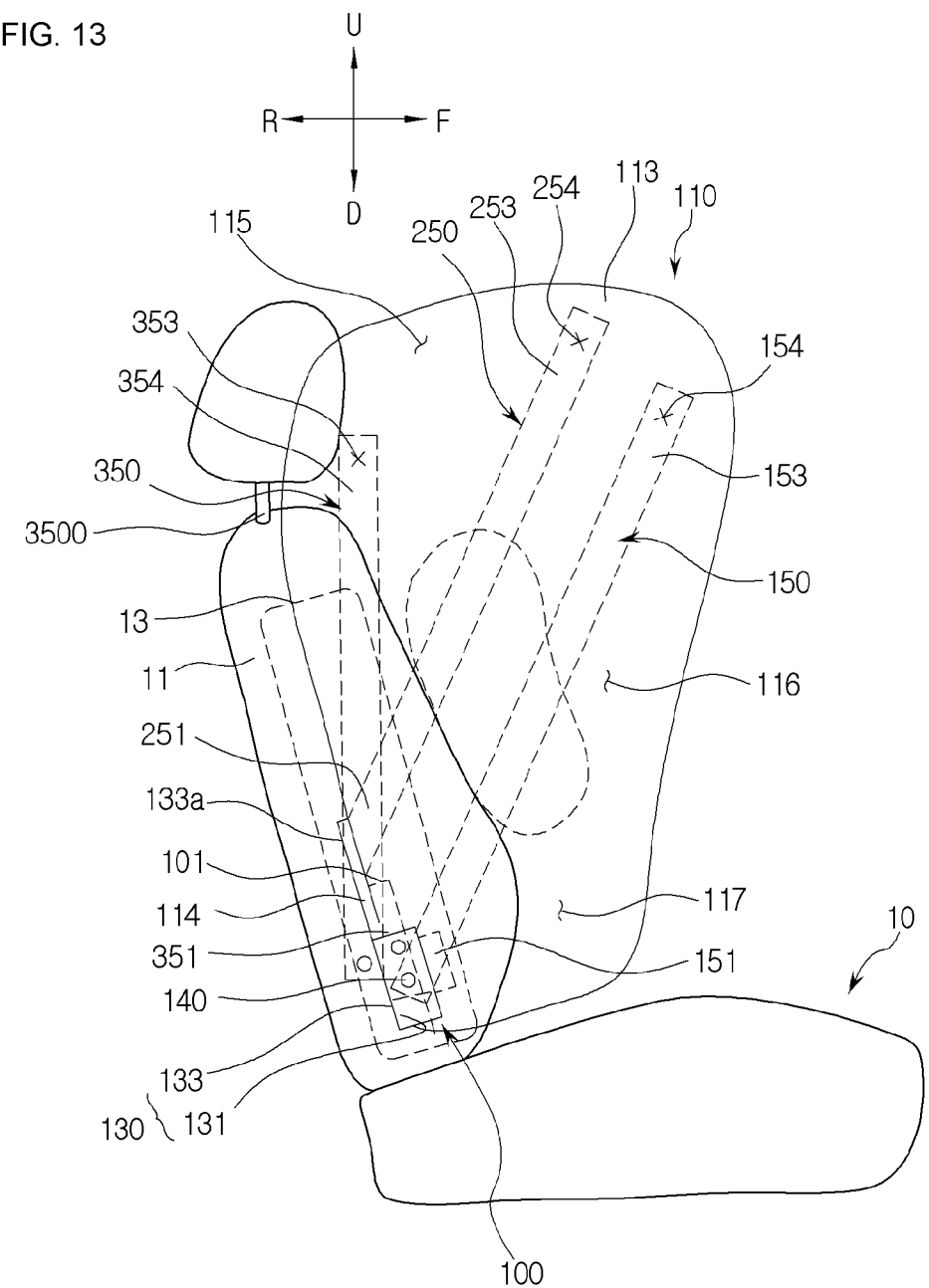

FAR-SIDE AIRBAG DEVICE OF VEHICLE

CROSS-REFERENCE TO RELATED APPLICATIONS

This application is a 371 U.S. National Stage of International Application No. PCT/KR2017/008195, filed Jul. 28, 2017, which claims priority to Korean Patent Application No. 10-2016-0096222, filed Jul. 28, 2016. The disclosures of the above applications are incorporated herein by reference.

TECHNICAL FIELD

The present invention relates to a far side airbag apparatus for a vehicle, which is deployed between two seats arranged in a widthwise direction of the vehicle upon collision of the vehicle to prevent a passenger from moving toward a center of the vehicle in the widthwise direction of the vehicle.

BACKGROUND ART

In a vehicle provided with at least two seats in a widthwise direction of the vehicle, when an impact is applied to a side of the vehicle due to side collision of the vehicle, a passenger seated on a seat near an impact portion is generally protected by an airbag apparatus. This type of airbag apparatus is generally referred to as a side airbag apparatus, in which an airbag and an inflator for supplying a gas to the airbag are provided in a backrest of the seat at an impact portion of the passenger. Generally, the inflator is disposed at a rear end in the airbag. In addition, the inflator is fastened to a seat frame in the backrest through the airbag, so that the rear end of the airbag is fixed to the seat frame.

In such a side airbag apparatus, when an impact is applied to a side of the vehicle, the inflator is activated, and an inflation gas is supplied to the airbag from the activated inflator. When a side airbag starts to expand by the inflation gas, the side airbag protrudes forward from the backrest with a part of the side airbag remaining in a seat back. Then, the side airbag expands forward between the passenger and the side of the vehicle. Therefore, the side airbag restrains the passenger from moving toward a collision side of the vehicle due to a side impact of the vehicle.

According to the related art, a far side airbag is provided at an inner side of the backrest directed to a center of the vehicle in the widthwise direction of the vehicle to prevent passengers from colliding with each other upon collision of the vehicle. The far side airbag is deployed substantially between two seats in the widthwise direction of the vehicle to restrain the passengers from moving toward the center of the vehicle in the widthwise direction of the vehicle.

In order to improve restraining performance of the far side airbag, it is required to effectively suppress rotation of the far side airbag about a fastening portion of the far side airbag due to an impact applied from the passenger upon the collision of the vehicle, and research related thereto has been continuously conducted.

DISCLOSURE

Technical Problem

An object of the present invention is to provide a far side airbag apparatus capable of effectively suppressing movement of a passenger toward a center of a vehicle in a widthwise direction of the vehicle upon collision of the vehicle.

Technical Solution

To achieve the objects described above, according to one embodiment of the present invention, there is provided a far side airbag apparatus for a vehicle, the far side airbag apparatus including: an airbag having one end installed at one side part of a seat frame directed to a central axis of a backrest extending in front and rear directions of the vehicle so as to be expanded and deployed between at least two backrests arranged in a widthwise direction of the vehicle, and including an inner panel directed to a passenger and an outer panel directed to the central axis of the vehicle when inflated; and an anti-rotation bracket for supporting a rear end of the airbag to prevent the airbag from rotating toward the central axis of the vehicle about the one end of the airbag connected to the one side part of the seat frame when the passenger collides with the inner panel of the airbag due to collision of the vehicle.

Advantageous Effects

According to one embodiment of the present invention, the rear end of the inflated airbag is supported by the anti-rotation bracket, so that the airbag can be prevented from rotating about the rear end of the airbag due to the impact applied from the passenger upon the collision of the vehicle, thereby effectively preventing the passenger from moving toward an inner center of the vehicle.

According to one embodiment of the present invention, the far side airbag apparatus further includes a tension member having one end restrained between the anti-rotation bracket and the seat frame and an opposite end connected with an outer surface of the inner panel of the airbag, so that the airbag can be pulled by the tension member toward the seat frame so as to increase airbag supporting strength, thereby effectively restraining the passenger from moving toward the inner center of the vehicle.

According to one embodiment of the present invention, an extension part is provided at a front end of a mounting part of the anti-rotation bracket, so that a restraining region can be increased at the one end of the tension member. Therefore, the airbag supporting strength can be increased according to increase in tension of the tension member, thereby enhancing a passenger restraining effect.

According to one embodiment of the present invention, the far side airbag apparatus further includes an anti-movement member for restraining the tension member to the extension part of the anti-rotation bracket so as to restrain movement of the tension member in a downward direction while being bent about a center of a front end of the extension part of the anti-rotation bracket when the airbag is rotated about the rear end of the airbag due to the impact applied from the passenger, so that appropriate tension can be applied to the tension member. Therefore, the airbag supporting strength can be increased, thereby enhancing the passenger restraining effect.

DESCRIPTION OF DRAWINGS

FIG. 13 is a side view showing a configuration of the far side airbag apparatus provided with a plurality of tension members according to the present invention.

BEST MODE

Mode for Invention

Hereinafter, embodiments of the present invention will be described in detail with reference to the accompanying drawings. However, the present invention may be embodied in various other forms, and should not be construed as being limited to the embodiments set forth herein. The embodiments disclosed herein are provided so that the disclosure of the present invention will be thorough and complete, and will fully convey the scope of the invention to those of ordinary skill in the art to which the present invention pertains.

In the following, a reference symbol F denotes a front of a vehicle to which a side curtain airbag of the present invention is applied, a reference symbol R denotes a rear of the vehicle, a reference symbol U denotes an upper side of the vehicle, a reference symbol D denotes a lower side of the vehicle, a reference symbol RH denotes a right side of the vehicle, and a reference symbol LH denotes a left side of the vehicle.

Figure 1:
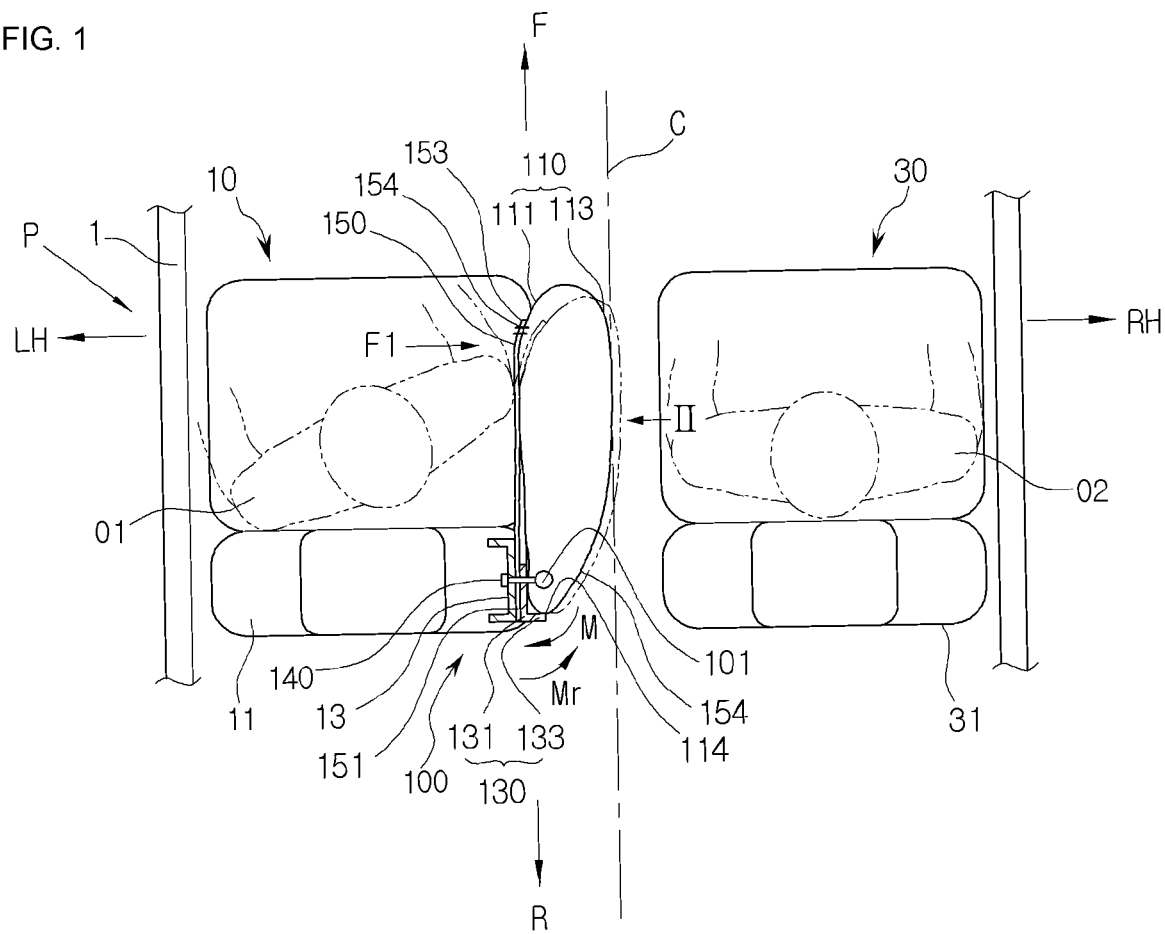
FIG. 1 is a plan view showing a state in which an inflated far side airbag apparatus is mounted on a driver's seat of a vehicle according to one embodiment of the present invention.
Figure 2:
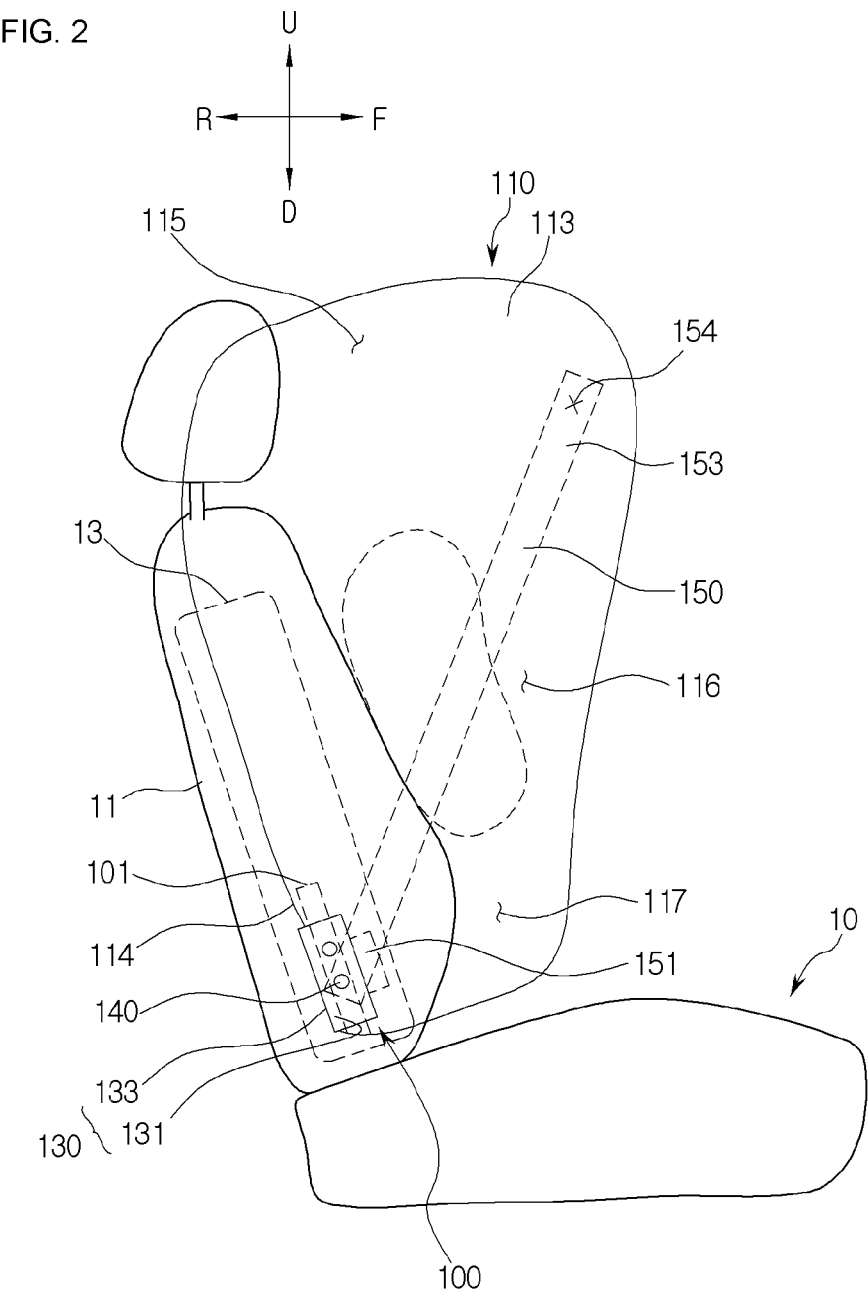
FIG. 2 is a side view obtained in a direction of an arrow II of FIG. 1.

FIG. 1 is a plan view showing a state in which an inflated far side airbag apparatus is mounted on a driver's seat of a vehicle according to one embodiment of the present invention, and FIG. 2 is a side view obtained in a direction of an arrow II of FIG. 1.

Referring to FIGS. 1 and 2, a far side airbag apparatus 100 is mounted on a backrest of a seat for a vehicle. The seat for the vehicle may be arranged, for example, on left and right sides in a widthwise direction of the vehicle about a central axis C along front and rear directions F and R of the vehicle. In the drawings, a driver's seat 10 is disposed on the left side about the central axis C of the vehicle, and a passenger's seat 30 is disposed on the right side about the central axis C of the vehicle.

According to one embodiment of the present invention, the far side airbag apparatus 100 is provided at an inner portion of a backrest 11 of the driver's seat 10 to restrain movement of a passenger 01 toward the central axis C of the vehicle. In another embodiment, the far side airbag apparatus 100 may be provided at an inner side of a backrest 31 of the passenger's seat 30 directed to the central axis C of the vehicle to restrain a passenger 02.

Hereinafter, an example of the far side airbag apparatus 100 provided at the inner portion of the backrest 11 of the driver's seat 10 will be described.

The far side airbag apparatus 100 may include an inflator 101, a far side airbag 110 (hereinafter referred to as "airbag"), an anti-rotation bracket 130, and a tension member 150.

The inflator 101 generates a gas for inflating and deploying the airbag 110. The inflator 101 may be mounted on a seat frame 13 of the backrest 11 and disposed on an inner rear end of the airbag 110. The inflator 101 may be fixed to the seat frame 13 together with the anti-rotation bracket 130 and the tension member 150 through a fastening member 140.

The airbag 110 is accommodated in the backrest 11 in a folded or rolled state together with the inflator 101 when the airbag 110 is not inflated, and deployed toward the front F of the vehicle when the gas is supplied from the inflator 101.

The airbag 110 has a cantilever shape in which a fastening portion adjacent to a rear end 114 of the airbag 110 is supported by the seat frame 13 of the backrest 11 and a front end of the airbag protrudes toward the front of the vehicle when the airbag 110 is inflated.

The airbag 110 includes an inner panel 111 directed to the passenger 01 and an outer panel 113 directed to the central axis C of the vehicle when the airbag 110 is inflated. According to one embodiment, the inner panel 111 and the outer panel 113 may be formed of separate fabrics and connected to each other via a sewing line. In another embodiment, the inner panel 111 and the outer panel 113 of the far side airbag 110 may be formed of a single fabric.

The airbag 110 may include a main expansion part 116 for protecting an abdominal region and a thoracic region of the passenger 01 and an upper expansion part 115 extending from an upper portion of the main expansion part 116 to protect a cephalic region of the passenger 01. In addition, the airbag 110 may further include a pygal region expansion part 117 for protecting a pygal region of the passenger.

Figure 3:
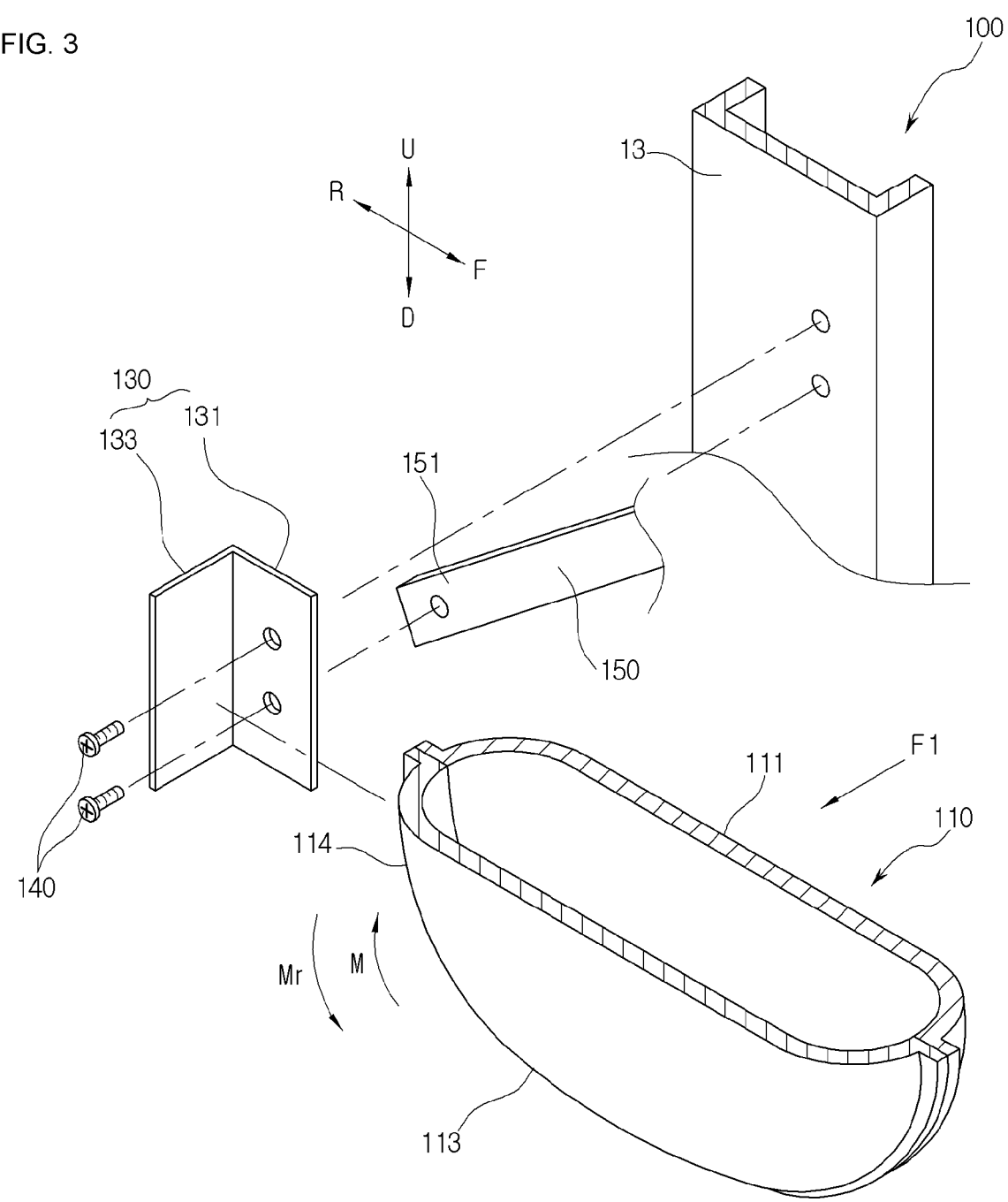
FIG. 3 is an exploded perspective view showing the far side airbag apparatus according to one embodiment of the present invention.

FIG. 3 is an exploded perspective view showing the far side airbag apparatus according to one embodiment of the present invention.

Referring to FIGS. 1 to 3, when an impact F1 is applied to the inner panel 111 of the inflated airbag 110 from the passenger 01 moving toward the central axis C of the vehicle due to vehicle collision, for example, side collision occurring on a vehicle body 1 on the left side LH of the vehicle, the anti-rotation bracket 130 is configured to prevent a moment M of rotating the airbag 110 about the fastening portion of the fastening member 140 in a clockwise direction from occurring.

The anti-rotation bracket 130 includes a mounting part 131 mounted at the seat frame 13 through the fastening member 140 such as a stud bolt and an anti-rotation part 133 protruding from the mounting part 131 at a substantially right angle toward the central axis C of the vehicle to support the rear end 114 of the airbag 110. The anti-rotation part 113 is not limited to a part making contact with the rear end 114 of the airbag 110, and may be configured to make contact with a part of an outer surface of the outer panel 113 of the airbag 110, including the rear end 114 of the airbag 110.

The anti-rotation part 133 makes contact with the rear end 114 of the inflated airbag 110 to press the rear end 114 of the airbag 110 toward the front F of the vehicle when the airbag 110 is rotated. Accordingly, a moment Mr, which cancels the moment M of rotating the airbag 110 about the fastening portion in the clockwise direction, acts on the airbag 110 so as to tightly restrain the passenger 01.

The anti-rotation bracket 130 may be formed of a material having rigidity sufficient to prevent the rotation of the airbag 110 which is rotated by the impact F1 applied from the passenger 01, for example, a metallic material. In another embodiment, the anti-rotation bracket 130 maybe formed of a high-strength plastic material.

The tension member 150 is connected to an outer side of the inner panel 111 of the airbag 110 such that the airbag 110 is inflated and deployed under tension, so that a moment may act in a direction for cancelling the moment M of rotating the airbag 110 about the fastening portion in the clockwise direction due to the impact F1 applied from the passenger 01, thereby tightly restraining the passenger 01. At least one tension member 150 may be provided.

One end 151 of the tension member 150 is interposed between the seat frame 13 and the mounting part 131 of the anti-rotation bracket 130, and an opposite end 153 of the tension member 150 is connected with the outer side of the inner panel 111 of the airbag 110.

The one end 151 of the tension member 150 may be fixed to the seat frame 13 together with the mounting part 131 of the anti-rotation bracket 130 through the fastening member 140. The opposite end 153 of the tension member 150 may be connected to the inner panel 111 of the airbag 110 via a sewing part 154, for example. The tension member 150 may include a strap-shaped member formed of a material identical to the material of the airbag 110.

The one end 151 of the tension member 150 may be connected to a lower rear end of the inflated airbag 110 together with the anti-rotation bracket 130, and the opposite end 153 of the tension member 150 may be connected to an upper front end of the inflated airbag 110. In such a configuration, the tension member 150 covers an outer surface of the inner panel 111 of the inflated airbag 110 across the inflated airbag 110 in a substantially diagonal direction. With such diagonal arrangement, the tension member 150 may restrain the airbag 110 in a wider range so as to effectively cancel the moment M of the airbag 110 caused by the impact F1 applied from the passenger 01.

According to one embodiment of the present invention, the one end 151 of the tension member 150 is provided between the mounting part 131 of the anti-rotation bracket 130 and the seat frame 13, so that, when the airbag 110 is rotated about the fastening portion due to the impact F1 applied from the passenger 01, the one end 151 of the tension member 150 is pulled substantially toward the seat frame 13 by the mounting part 131 of the anti-rotation bracket 130, thereby enhancing an effect of preventing the airbag 110 from rotating about the fastening portion.

Next, an operation of the far side airbag apparatus 100 configured as described above will be described.

Hereinafter, a left side collision situation in which an impact is applied to the left side of the vehicle will be described.

When an impact detection sensor (not shown) detects left side collision of the vehicle, the inflator 101 is activated. The gas generated from the inflator 101 is supplied to an inside of the airbag 110 so that the airbag 110 is deployed to the front F of the vehicle from the inner portion of the backrest 11 of the driver's seat 10.

A predetermined impact F1 is applied from the passenger 01 to the airbag 110 as the passenger 01 moves toward the central axis C of the vehicle due to the vehicle collision. The impact F1 applied from the passenger 01 may cause the moment M of rotating the airbag 110 about the fastening portion in the clockwise direction. At this time, the rear end 114 of the airbag 110 makes contact with the anti-rotation part 133 of the anti-rotation bracket 130, so that a force directed to the front of the vehicle is applied to the rear end 114 of the airbag 110. As a result, the moment Mr, which acts in the direction for cancelling the moment M generated by the impact F1 applied from the passenger 01, acts. Accordingly, the rotation of the airbag 110 about the fastening portion is effectively restrained, so that an effect of restraining the passenger 01 can be enhanced.

In addition, according to one embodiment of the present invention, when the airbag 110 is deployed, the tension member 150 provided on the outer surface of the inner panel 111 of the airbag 110 is deployed to apply the tension, and the tension member 150 covers the outer surface of the inner panel 111 of the airbag 110 in a substantially diagonal direction. Accordingly, the pygal region expansion part 117, the main expansion part 116, and the upper expansion part 115 of the airbag 110 are supported, and the airbag 110 is prevented from rotating about the fastening portion.

In more detail, the one end 151 of the tension member 150 is mounted at the seat frame 13 together with the mounting part 131 of the anti-rotation bracket 130 through the fastening member 140 and connected to the lower rear end of the airbag 110, and the opposite end 153 of the tension member 150 is connected to the upper front end of the airbag 110. Accordingly, the pygal region expansion part 117, the main expansion part 116, and the upper expansion part 115, which are disposed at the outer surface of the inner panel 111 of the airbag 110, are covered by the tension member 150. Therefore, the pygal region expansion part 117, the main expansion part 116, and the upper expansion part 115 of the airbag 110 are pulled toward the seat frame 13. Thus, the moment Mr, which acts in the direction for canceling the moment M due to the impact F1 of the passenger 01, may act on the airbag 110 (the pygal region expansion part 117, the main expansion part 116, and the upper expansion part 115) by the tension member 150.

In this case, the one end 151 of the tension member 150 is disposed between the seat frame 13 and the mounting part 131 of the anti-rotation bracket 130, so that the airbag 110 is more effectively prevented from rotating, thereby contributing to improvement of restraining performance of the airbag 110 for the passenger 01.

As described above, in a case of the side collision, the far side airbag apparatus 100 of the present invention can effectively suppress the movement of the passenger 01 toward the central axis C of the vehicle in the widthwise direction of the vehicle.

Figure 4:
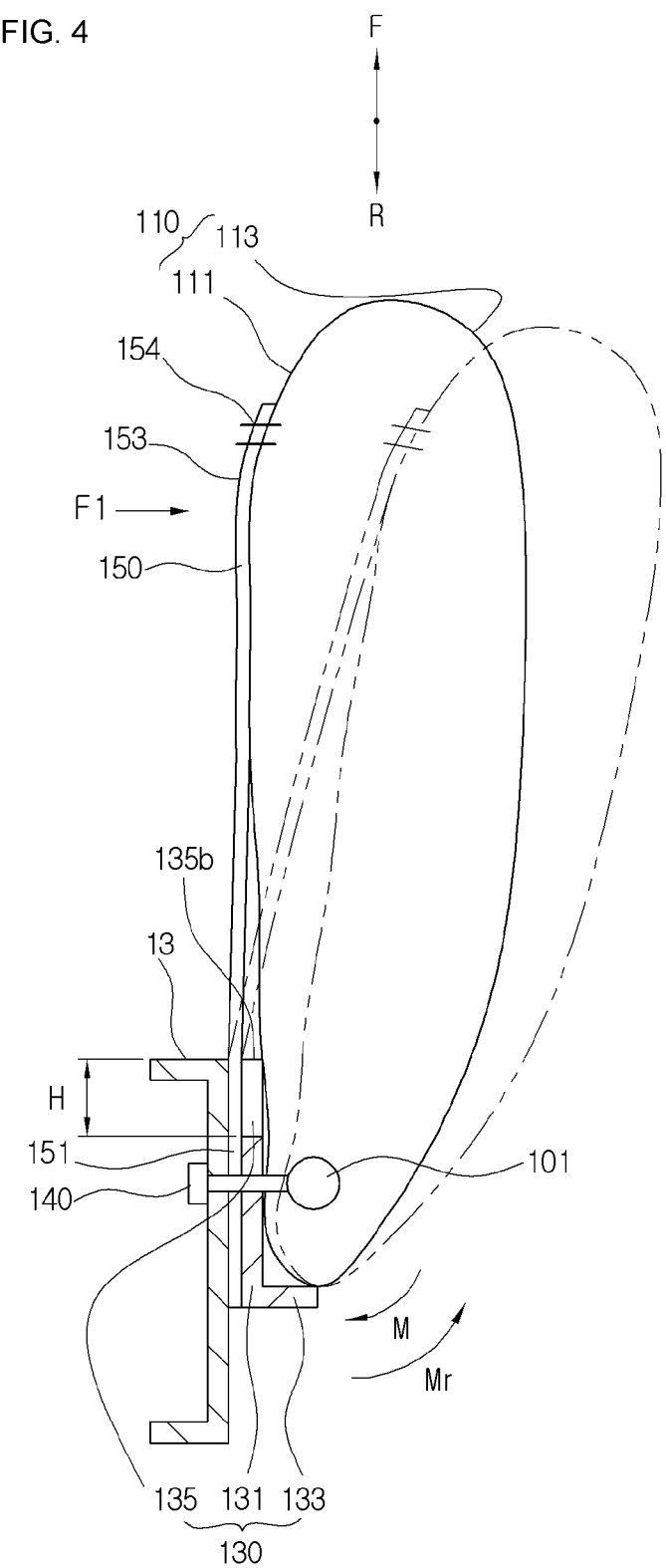
FIG. 4 is a plan view showing a configuration of an inflated far side airbag apparatus according to another embodiment of the present invention.
Figure 5:
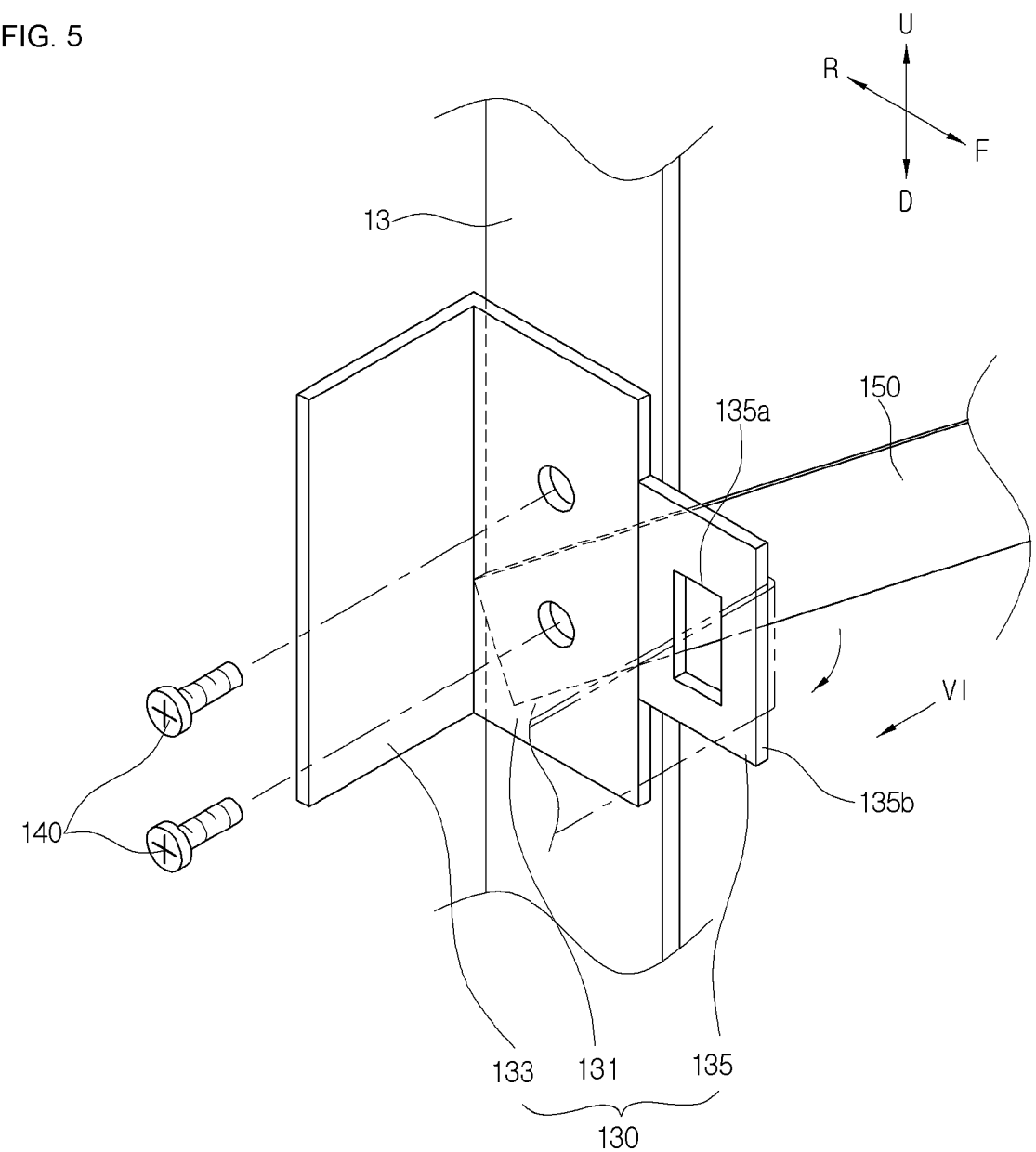
FIG. 5 is a perspective view showing a state in which a part of the configuration of the far side airbag apparatus is partially assembled according to another embodiment of the present invention.

FIG. 4 is a plan view showing a configuration of an inflated far side airbag apparatus according to another embodiment of the present invention, and FIG. 5 is a perspective view showing a state in which a part of the configuration of the far side airbag apparatus is partially assembled according to another embodiment of the present invention.

In the following, like reference numerals refer to like elements of the configuration described above, and any redundant description thereof will be omitted.

Referring to FIGS. 4 and 5, the anti-rotation bracket 130 includes an extension part 135 extending from a front end of the mounting part 131 toward the front F of the vehicle.

While the airbag 110 is deployed, the extension part 135 may increase a restraining length toward the front F of the vehicle on the one end 151 of the tension member 150 by a distance H so as to increase the tension acting on the tension member 150. As a result, the airbag 110 can be effectively prevented from rotating about the fastening portion of the airbag 110 due to the impact F1 applied from the passenger 01 moving toward the central axis C of the vehicle.

The extension part 135 may be formed integrally with the mounting part 131 of the anti-rotation bracket 130. In another embodiment, the extension part 135 may be provided as a member separate from the mounting part 131 of the anti-rotation bracket 130 and connected to the mounting part 131 through the fastening member (not shown). A penetration portion 135a is formed at a center of the extension part 135 to reduce a weight and a material cost.

Referring to FIGS. 1, 4 and 5, when the moment M of rotating the airbag 110 about the fastening portion in the clockwise direction occurs in the airbag 110 due to the impact F1 applied from the passenger 01 (indicated by a dotted line in FIG. 4), the tension member 150 may be moved in a downward direction D of the vehicle (indicated by a dotted line in FIG. 5) or an upper direction L of the vehicle while being bent about a front end 135b of the extension part 135 of the anti-rotation bracket 130.

When the tension member 150 is moved in the downward direction D or the upward direction L along the front end 135b of the extension part 135 of the anti-rotation bracket 130 as described above, a restraining force of the airbag 110 is reduced, so that an effect of restraining a passenger moving toward the central axis C of the vehicle is reduced.

Therefore, according to the present invention, the extension part 135 is provided with an anti-movement member 160 for restraining the movement of the tension member 150 in the downward direction L or the upward direction L.

Figure 6:
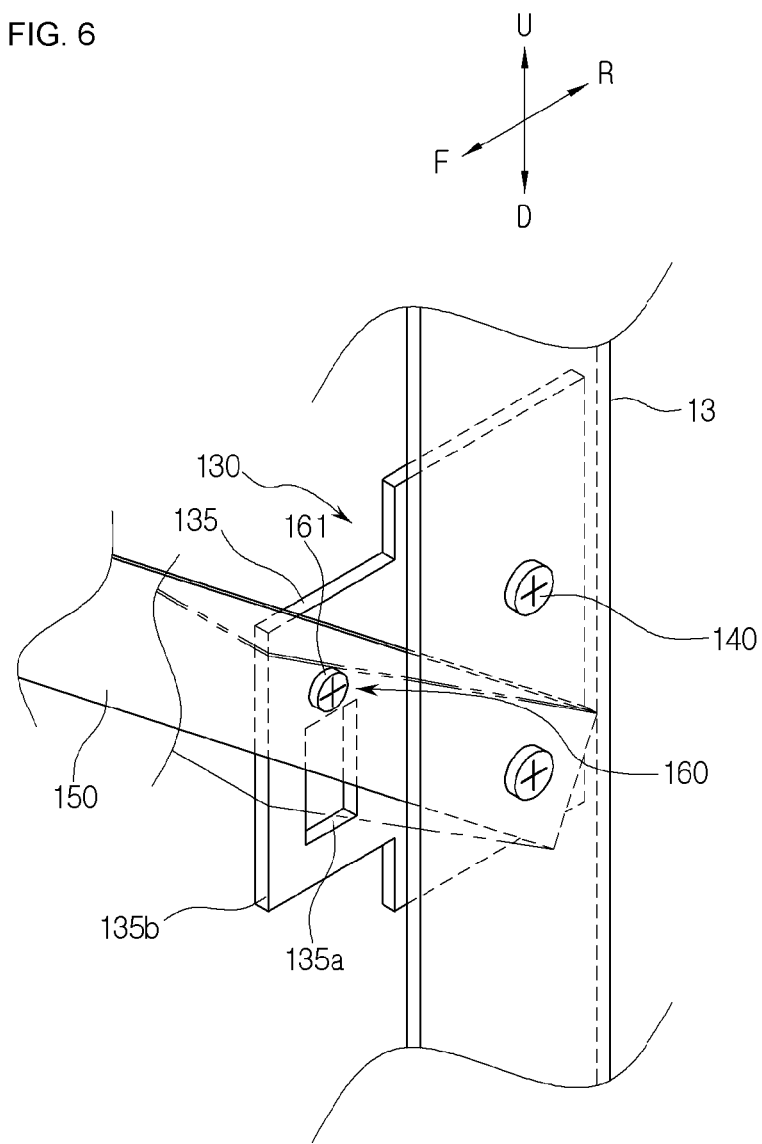
FIG. 6 is a perspective view showing a configuration of restraining device for a tension member according to one embodiment of the present invention.

FIG. 6 is a perspective view showing a configuration of restraining device for a tension member according to one embodiment of the present invention, which is a side view obtained in a direction of an arrow VI of FIG. 5.

Referring to FIG. 6, the anti-movement member 160 may include a fastening member 161 for fastening the tension member 150 to the extension part 135, for example, a stud bolt.

Figure 7:
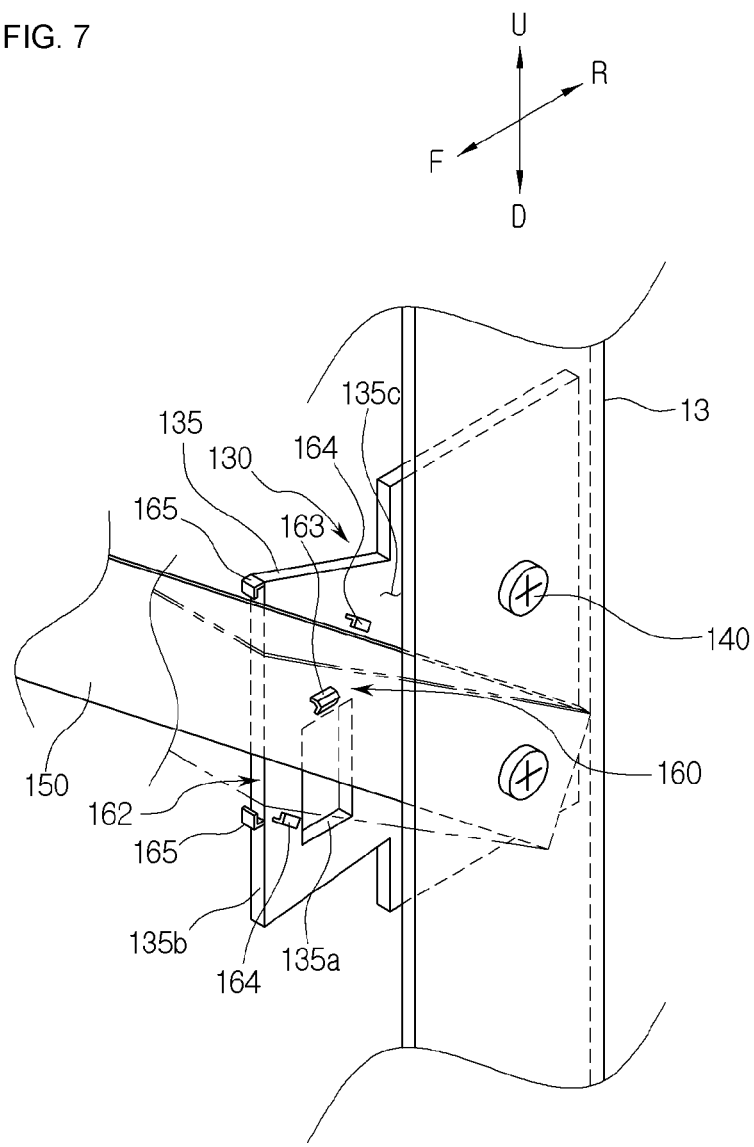
FIG. 7 is a perspective view showing a configuration of restraining device for a tension member according to another embodiment of the present invention.

FIG. 7 is a perspective view showing a configuration of restraining device for a tension member according to another embodiment of the present invention.

Referring to FIG. 7, the anti-movement member 160 includes a latching part 162 formed at the extension part 135 of the anti-rotation bracket 130 to restrain the tension member 150.

The latching part 162 may include a front hook 165 protruding from a surface 135c of the extension part 135 of the anti-rotation bracket 130 directed to the tension member 150 and latched to upper and lower ends 154 and 155 of the tension member 150.

The latching part 162 may include a side hook 164 protruding forward (F) from a front end 135a of the extension part 135 of the anti-rotation bracket 130 and latched to the upper and lower ends 154 and 155 of the tension member 150.

In another embodiment, the latching part 162 may include a through-hook protruding from the surface 135c of the extension part 135 of the anti-rotation bracket 130 directed to the tension member 150 and passing through the tension member 150.

A shape of the extension part 135 of the anti-rotation bracket 130 may be variously changed depending on arrangement of the tension member 150. For example, FIG. 7 shows a case in which an upper portion of the extension part 135, which is inclined upward in a diagonal shape, extends upward to have a substantially trapezoidal shape. When the extension part 135 has a trapezoidal shape as described above, a supporting area of the tension member 150 is increased, so that the tension can be increased.

Figure 8:
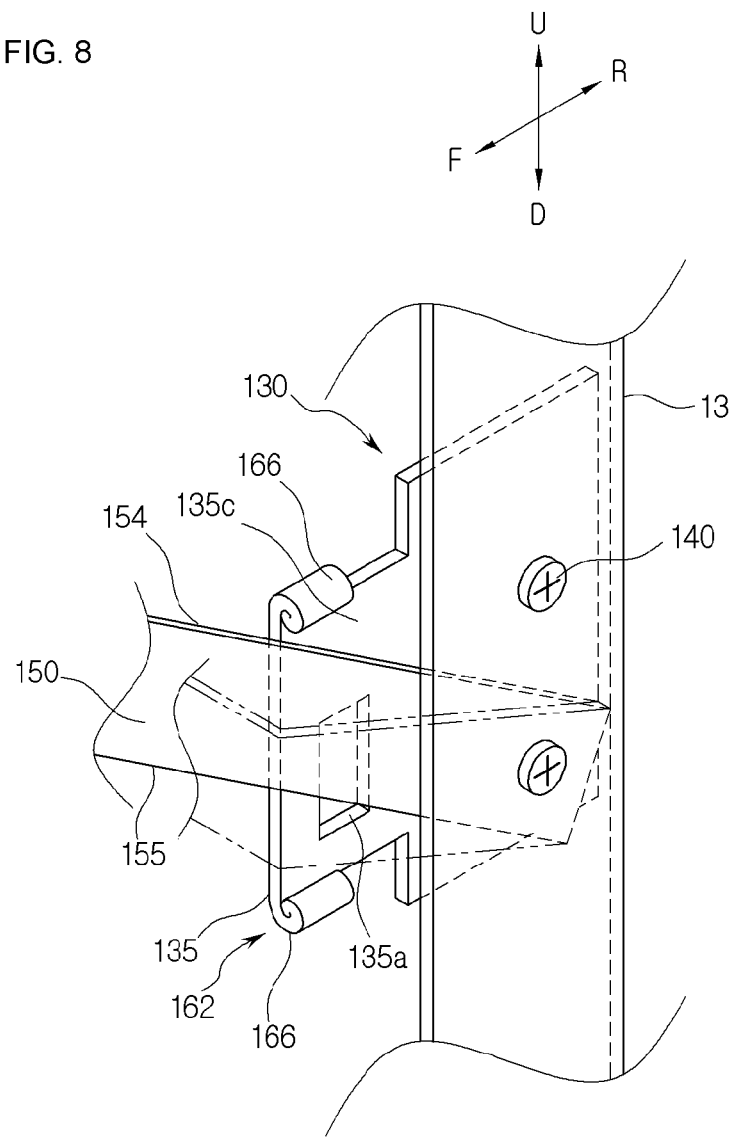
FIG. 8 is a perspective view showing a configuration of restraining device for a tension member according to still another embodiment of the present invention.

FIG. 8 is a perspective view showing a configuration of restraining device for a tension member according to still another embodiment of the present invention.

Referring to FIG. 8, the latching part 162 of the anti-movement member 160 of the anti-rotation bracket 130 may include a rolling portion 166 formed by rolling upper and lower ends of the extension part 135 of the anti-rotation bracket 130. A shape and a position of the latching part 162 are not limited to the above-described embodiment, and may be variously changed.

The anti-movement member 160 as described above, for example, the fastening member 161, the front hook 165, the side hook 164, the through-hook 163, or the like may prevent the tension member 150 from moving in the downward direction D or the upward direction L while being bent about the front end 135b of the extension part 135 as the airbag 110 is rotated about the fastening portion due to the impact F1 applied from the passenger 01. As a result, a restraining force of the tension member 150 can be prevented from being reduced, thereby enhancing a passenger restraining effect.

Figure 9:
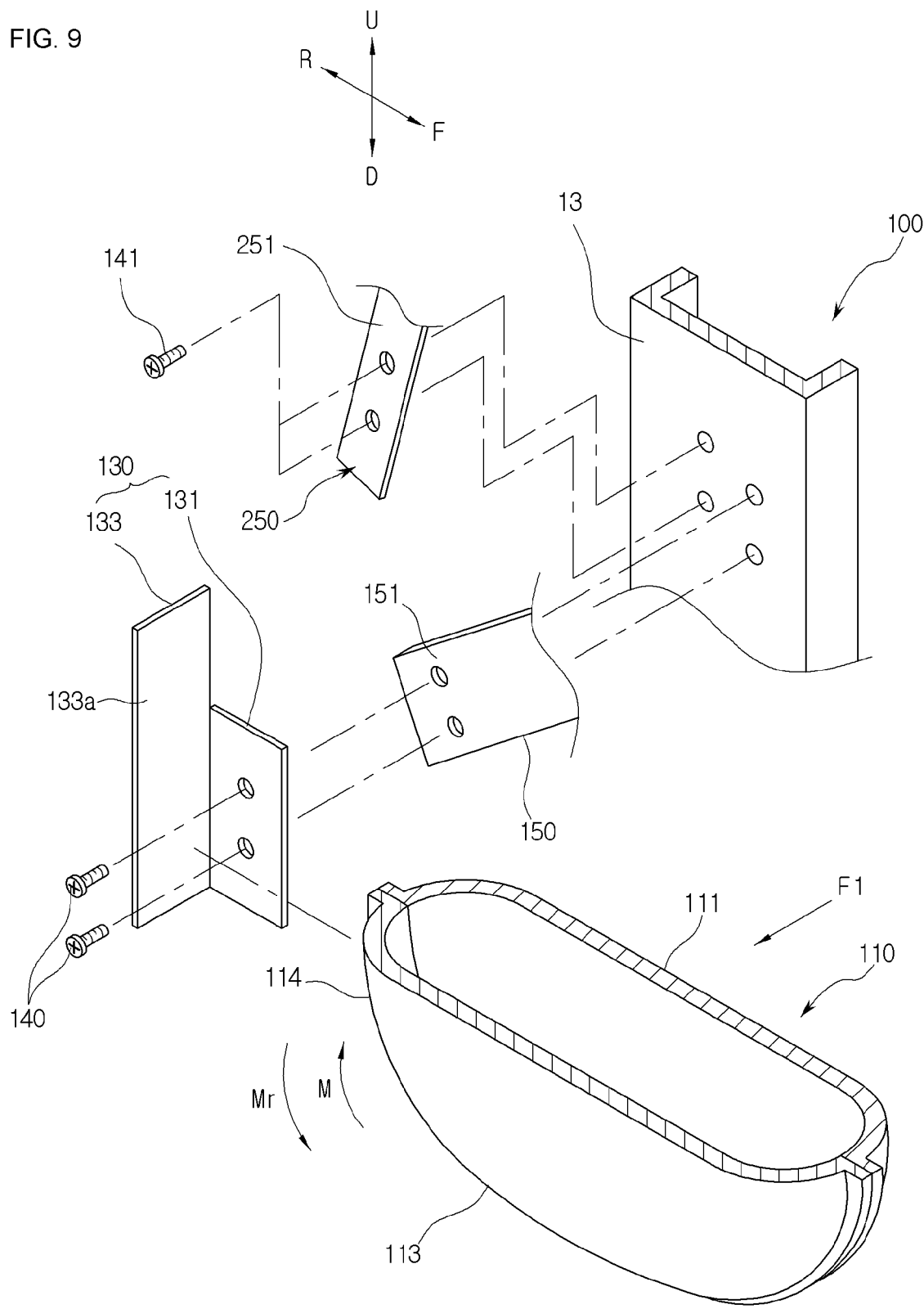
FIG. 9 is a perspective view showing another configuration of an anti-rotation bracket of the restraining device for the tension member according to the present invention.
Figure 10:
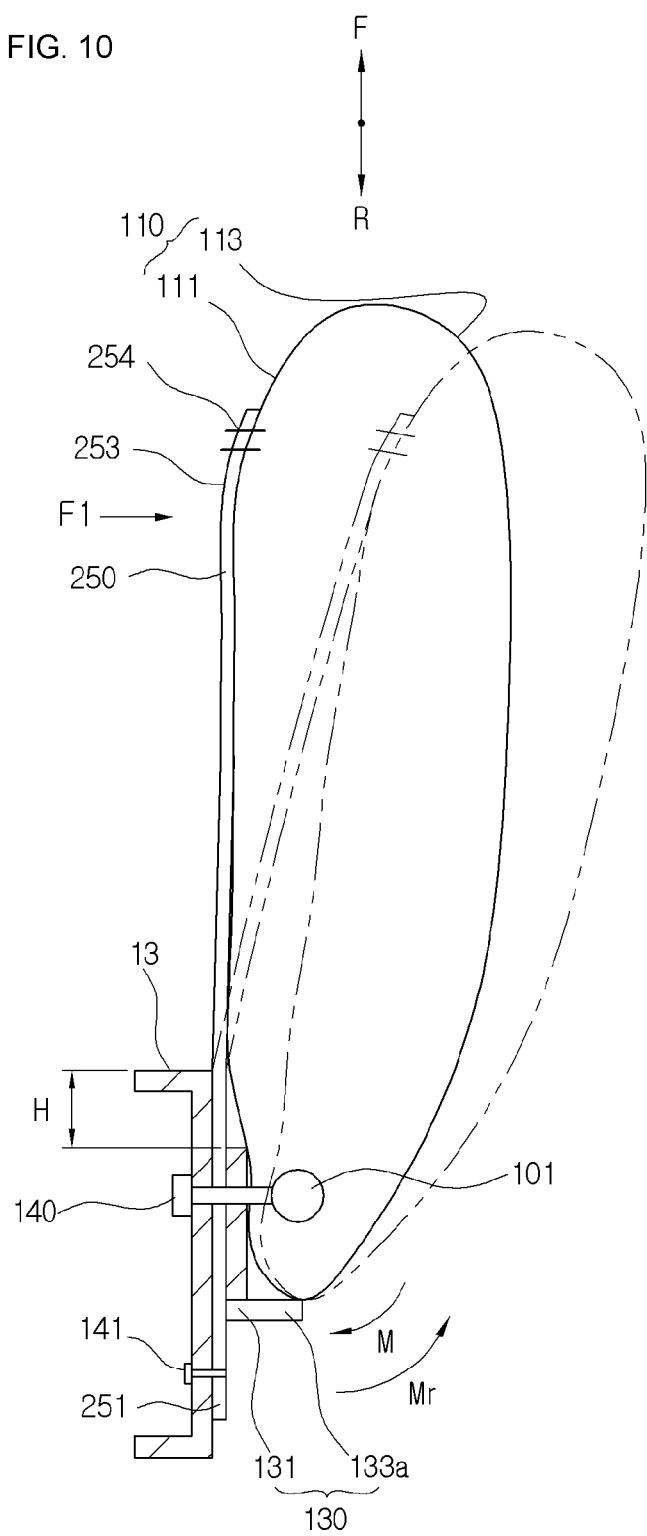
FIG. 10 is a plan view showing a configuration of the far side airbag apparatus to which the anti-rotation bracket of FIG. 9 is applied.

FIG. 9 is a perspective view showing another configuration of an anti-rotation bracket of the restraining device for the tension member according to the present invention, and FIG. 10 is a plan view showing a configuration of the far side airbag apparatus to which the anti-rotation bracket of FIG. 9 is applied.

In the following, like reference numerals refer to like elements of the configuration described above, and any redundant description thereof will be omitted.

Referring to FIGS. 9 and 10, the anti-rotation part 133 of the anti-rotation bracket 130 further includes an upper extension portion 133a extending in the upward direction U or the anti-rotation part 133.

One end 251 of a tension member 250 is coupled to the seat frame 13 through the fastening member 141. An opposite end 253 of the tension member 250 is coupled to the airbag 110 via a sewing line 254.

Figure 11:
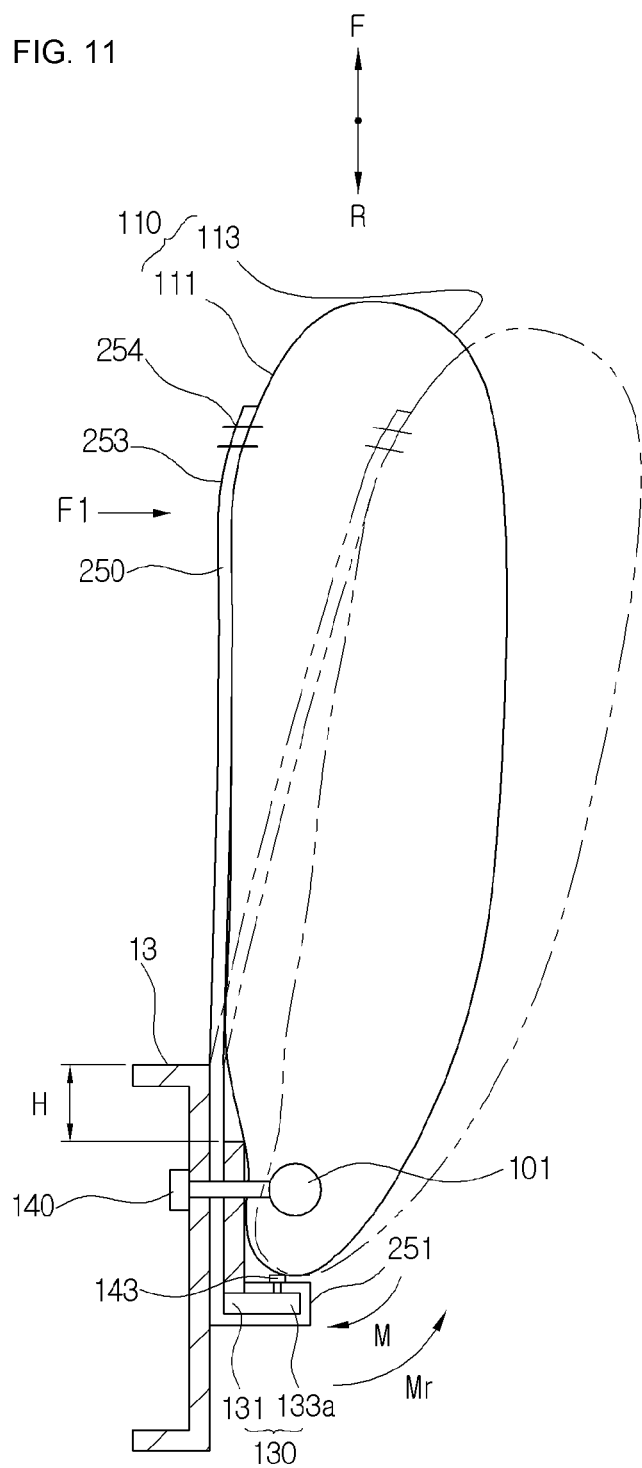
FIG. 11 is a plan view showing a state in which a part of the tension member is connected to the anti-rotation bracket according to the present invention.

According to the present invention, the one end 251 of the tension member 250 is further extended by a predetermined length in the upward direction U by the upper extension portion 133a of the anti-rotation part 133 of the anti-rotation bracket 130 for support, so that an effect of supporting the airbag 110 can be enhanced. FIG. 11 is a plan view showing a state in which a part of the tension member is connected to the anti-rotation bracket according to the present invention.

Referring to FIG. 11, the one end 251 of the tension member 250 is connected to the anti-rotation bracket 130. For example, the one end 251 of the tension member 250 may be fixed to the upper extension portion 133a by a fixing member 143 after surrounding the upper extension portion 133a of the anti-rotation part 133 of the anti-rotation bracket 130. The fixing member 143 may include a hook or stud member protruding from the upper extension portion 133a of the anti-rotation bracket 130. In another embodiment, the fixing member 143 may include a fastening bolt or the like provided separately from the upper extension portion 133a of the anti-rotation bracket 130. The opposite end 253 of the tension member 250 is connected to an upper portion of the airbag 100 via the sewing line 254.

In FIG. 11, the one end 251 of the tension member 250 is shown to be connected in such a manner as to surround a bottom surface of the upper extension portion 133a, but a connection scheme thereof is changeable. In other words, the one end 251 of the tension member 250 may be connected such that the one end 251 of the tension member 250 is rotated in the clockwise direction from an upper surface of the upper extension portion 133a of the anti-rotation bracket 130 and fixed to the bottom surface of the upper extension portion 133a.

With such a configuration, when the tension member 250 may not be coupled to the seat frame 13 due to structural constraints of the seat frame 13, the tension member 250 may be coupled to the anti-rotation bracket 130 to obtain an effect as if the tension member 250 is coupled to the seat frame 13.

Figure 12:
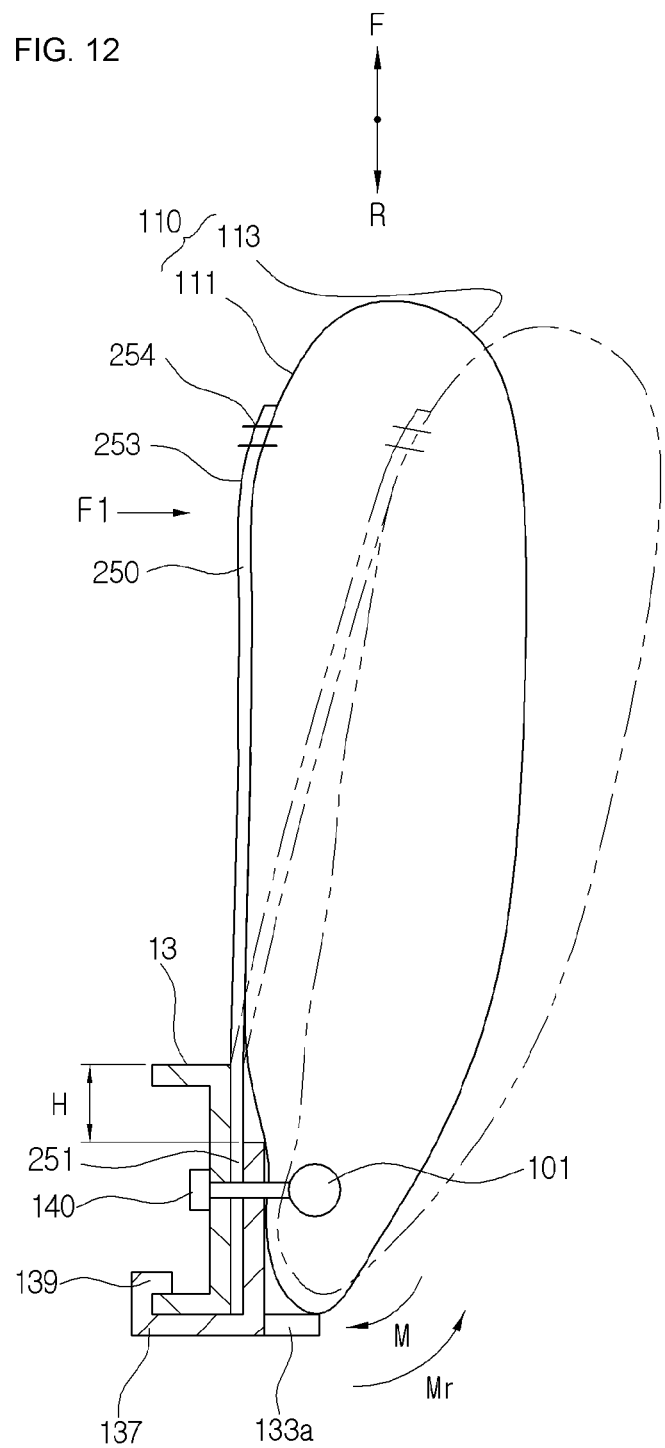
FIG. 12 is a plan view showing the far side airbag apparatus provided with another anti-rotation bracket of the restraining device for the tension member according to the present invention.

FIG. 12 is a plan view showing the far side airbag apparatus provided with another anti-rotation bracket of the restraining device for the tension member according to the present invention.

Referring to FIG. 12, the anti-rotation bracket 130 includes an additional mounting part 137 latched to an inner side portion of the seat frame 13 while surrounding the seat frame 13. The additional mounting part 137 may, for example, extend from the extension part 133a of the anti-rotation bracket 130. The additional mounting part 137 is not limited to a part extending from the extension part 133a of the anti-rotation bracket 130, and a position of additional mounting part 137 may be variously changed.

The additional mounting part 137 may be provided at an end thereof with a fixing part 139 latched to the inner side portion of the seat frame 13. Similar to the rolling portion 166 shown in FIG. 8, the fixing part 139 may be formed by partially rolling the end of the additional mounting part 137. In another embodiment, the fixing part 139 may include a hook or stud portion protruding from the additional mounting part 137, or may include a fastening member or the like provided separately from the additional mounting part 137.

For example, the additional mounting part 137 of the present invention may effectively prevent the upper extension portion 133a from being deformed due to the tension member 250 connected to the upper extension portion 133a of the anti-rotation bracket 130.

In other words, when the one end 251 of the tension member 250 is connected to the upper extension portion 133a of the anti-rotation part 133 of the anti-rotation bracket 130, the additional mounting part 137 reinforces the upper extension portion 133a. Thus, the upper extension portion 133a can be prevented from being deformed by a force applied thereto when the tension member 250 is bent toward the central axis of an interior of the vehicle due to the impact F1 applied from the passenger.

FIG. 13 is a side view showing a configuration of the far side airbag apparatus provided with a plurality of tension members according to the present invention.

FIG. 13 shows the far side airbag apparatus 100 to which the anti-rotation bracket 130 having the upper extension portion 133a of FIG. 9 is applied.

Referring to FIG. 13, the far side airbag apparatus 100 is provided with a first tension member 150, a second tension member 250, and a third tension member 350.

Referring to FIG. 13, one end 151 of the first tension member 150 may be fixed to the seat frame 13 together with the mounting part 131 of the anti-rotation bracket 130 through the fastening member 140, and an opposite end 153 of the first tension member 150 may be connected to the upper portion of the airbag 110 via a sewing line 154. The first tension member 150 is connected to the upper front end of the airbag 110 from the lower rear end of the airbag 110 while being arranged in a substantially diagonal shape.

One end 251 of the second tension member 250 may be fixed correspondingly to an upper extension portion 113a of the anti-rotation part 133 of the anti-rotation bracket 130, and an opposite end 253 of the second tension member 250 may be connected to the upper portion of the airbag 110 via the sewing line 254. The one end 251 of the second tension member 250 may be fixed to the seat frame 13, or may be fixed to the upper extension portion 113a of the anti-rotation part 133.

Similar to a coupling scheme of the first tension member 150, one end 351 of the third tension member 350 is fixed to the seat frame 13 together with the mounting part 131 of the anti-rotation bracket 130 through the fastening member 140, and an opposite end 353 of the third tension member 350 is connected to the upper portion of the airbag 110 via a sewing line 354. The one end 351 of the third tension member 350 may be connected to the lower rear end of the airbag 110, and the opposite end 353 of the third tension member 350 may be connected to an upper rear end of the airbag 110 while being arranged in a substantially straight line.

In the above description, the three tension members are provided, but the present invention is not limited thereto. A coupling position, arrangement and the like of the tension members may be variously changed, and one or more tension members may be provided to enhance the effect of supporting the airbag 110.

Although the present invention has been described with reference to the above preferred embodiments taken in conjunction with the accompanying drawings, the present invention is not limited to the embodiments, and the scope of the present invention is defined by the appended claims. Therefore, it will be understood by those of ordinary skill in the art to which the invention pertains that various changes and modifications may be made without departing from the spirit and scope of the present invention.

INDUSTRIAL APPLICABILITY

The present invention may be applied to a far side airbag apparatus technology capable of effectively suppressing the movement of the passenger toward the center of the vehicle in the widthwise direction of the vehicle.

The invention claimed is:

1. A far side airbag apparatus for a vehicle, the far side airbag apparatus comprising:
    an airbag having one end installed at one side part of a seat frame directed to a central axis of the vehicle extending in front and rear directions of the vehicle so as to be expanded and deployed between at least first and second backrests arranged in a widthwise direction of the vehicle, and including an inner panel directed to a passenger and an outer panel directed to the central axis of the vehicle when inflated;

an anti-rotation bracket for supporting at least a rear end of the airbag to prevent the airbag from rotating toward the central axis of the vehicle about the one end of the airbag connected to the one side part of the seat frame when a passenger collides with the inner panel of the airbag due to collision of the vehicle, the anti-rotation bracket including a mounting part and an anti-rotation part, the mounting part mounted at the seat frame through a fastening member, the anti-rotation part extending from the mounting part to make contact with the rear end of the airbag;

a tension member having one end interposed between the mounting part of the anti-rotation bracket and the inner panel of the airbag and an opposite end connected with the inner panel of the airbag; and an extension part protruding from a front end of the mounting part of the anti-rotation bracket to restrain the tension member such that the tension member extends toward a front of the vehicle when the airbag is inflated.

2. The far side airbag apparatus of claim 1, wherein the one end of the tension member is fixed to the seat frame of the vehicle together with the anti-rotation bracket through the fastening member.

3. The far side airbag apparatus of claim 1, further comprising an anti-movement member for restraining the tension member to the extension part of the anti-rotation bracket so as to restrain movement of the tension member in an upward direction or a downward direction of the vehicle while being bent toward the central axis of the vehicle about a front end of the extension part when the passenger makes contact with the inner panel of the airbag.

4. The far side airbag apparatus of claim 3, wherein the anti-movement member comprises a latching part formed at the extension part of the anti-rotation bracket to restrain the tension member.

5. The far side airbag apparatus of claim 4, wherein the latching part comprises at least one of:
- a front hook protruding from a surface of the extension part of the anti-rotation bracket directed to the tension member and latched to upper and lower ends of the tension member;
- a side hook protruding forward from the front end of the extension part and latched to the upper and lower ends of the tension member; and
- a through-hook protruding from the surface of the extension part directed to the tension member and passing through the tension member.

6. The far side airbag apparatus of claim 4, wherein the latching part comprises a rolling portion formed by rolling upper and lower ends of the extension part of the anti-rotation bracket.

7. The far side airbag apparatus of claim 3, wherein the anti-movement member comprises a fastening member fastened to the extension part of the anti-rotation bracket by penetrating the tension member.

8. The far side airbag apparatus of claim 1, wherein the extension part of the anti-rotation bracket comprises a penetration portion.

9. The far side airbag apparatus of claim 1, wherein the anti-rotation part of the anti-rotation bracket further comprises an upper extension portion extending longer than an upward length of the mounting part.

10. The far side airbag apparatus of claim 9, wherein the one end of the tension member is fixed to the upper extension portion of the anti-rotation bracket.

11. A far side airbag apparatus for a vehicle, the far side airbag apparatus comprising:

an airbag having one end installed at one side part of a seat frame directed to a central axis of the vehicle extending in front and rear directions of the vehicle so as to be expanded and deployed between at least first and second backrests arranged in a widthwise direction of the vehicle, and including an inner panel directed to a passenger and an outer panel directed to the central axis of the vehicle when inflated;

an anti-rotation bracket for supporting at least a rear end of the airbag to prevent the airbag from rotating toward the central axis of the vehicle about the one end of the airbag connected to the one side part of the seat frame when a passenger collides with the inner panel of the airbag due to collision of the vehicle, the anti-rotation bracket including a mounting part and an anti-rotation part, the mounting part mounted at the seat frame through a fastening member, the anti-rotation part extending from the mounting part to make contact with the rear end of the airbag, the anti-rotation bracket further an upper extension portion extending longer than an upward length of the mounting part; and a tension member having one end interposed between the mounting part of the anti-rotation bracket and the inner panel of the airbag and an opposite end connected with the inner panel of the airbag, wherein the one end of the tension member is fixed to the upper extension portion of the anti-rotation bracket by a fixing member after surrounding the upper extension portion of the anti-rotation bracket.

12. A far side airbag apparatus for a vehicle, the far side airbag apparatus comprising:

an airbag having one end installed at one side part of a seat frame directed to a central axis of the vehicle extending in front and rear directions of the vehicle so as to be expanded and deployed between at least first and second backrests arranged in a widthwise direction of the vehicle, and including an inner panel directed to a passenger and an outer panel directed to the central axis of the vehicle when inflated;

an anti-rotation bracket for supporting at least a rear end of the airbag to prevent the airbag from rotating toward the central axis of the vehicle about the one end of the airbag connected to the one side part of the seat frame when a passenger collides with the inner panel of the airbag due to collision of the vehicle, the anti-rotation member including a mounting part and an anti-rotation part, the mounting part mounted at the seat frame through a fastening member, the anti-rotation part extending from the mounting part to make contact with the rear end of the airbag, the anti-rotation bracket further an upper extension portion extending longer than an upward length of the mounting part; and a tension member having one end interposed between the mounting part of the anti-rotation bracket and the inner panel of the airbag and an opposite end connected with the inner panel of the airbag, the one end of the tension member is fixed to the upper extension portion of the anti-rotation bracket, wherein the anti-rotation bracket further comprises an additional mounting part fixed to an inner side of the seat frame after surrounding the seat frame.

* * * * *